US012716271B2

(12) United States Patent
Zarbeck et al.

(10) Patent No.: US 12,716,271 B2
(45) Date of Patent: Aug. 25, 2026

(54) ROLLING SHUTTER RETRACTABLE STOP BAR

(71) Applicant: Qualitas Manufacturing Incorporated, Itasca, IL (US)

(72) Inventors: Craig N. Zarbeck, Stevensville, MI (US); Orlando Amil, Chicago, IL (US)

(73) Assignee: Qualitas Manufacturing Incorporated, Itasca, IL (US)

( * ) Notice: Subject to any disclaimer, the term of this patent is extended or adjusted under 35 U.S.C. 154(b) by 595 days.

(21) Appl. No.: 17/958,588

(22) Filed: Oct. 3, 2022

(65) Prior Publication Data

US 2024/0110409 A1 Apr. 4, 2024

(51) Int. Cl.
*E06B 9/17* (2006.01)
*E05B 65/00* (2006.01)

(52) U.S. Cl.
CPC ...... *E05B 65/0021* (2013.01); *E06B 9/17046* (2013.01)

(58) Field of Classification Search
CPC ...... E06B 9/11; E06B 9/15; E06B 2009/1505; E06B 9/17; E06B 9/17046; E06B 9/86; E05C 1/004; Y10T 292/1018; E05B 65/087; E05B 65/0876; E05B 65/0021
See application file for complete search history.

(56) References Cited

U.S. PATENT DOCUMENTS 1,378,622 A * 5/1921 Sarbij ................ E05B 17/2038 292/150
3,078,917 A 2/1963 Recchione
4,807,687 A 2/1989 Finch et al.
5,090,468 A * 2/1992 Tedeschi .................. E06B 9/54 160/271
5,657,805 A * 8/1997 Magro .................... E06B 9/581 160/133
6,021,837 A * 2/2000 Miller ..................... E06B 9/174 160/133
6,095,224 A * 8/2000 Miller ..................... E06B 9/174 160/133
6,893,060 B2 * 5/2005 Ng ........................ E05B 45/083 70/417
7,028,738 B2 4/2006 Ceccofiglio
7,464,743 B1 12/2008 Berger
8,616,261 B2 12/2013 Miller
8,944,137 B2 2/2015 Miller
9,074,411 B2 7/2015 Miller et al.
2014/0021726 A1 * 1/2014 Daniels .................. E05B 13/04 292/145

FOREIGN PATENT DOCUMENTS

EP 3450674 B1 4/2021

* cited by examiner

*Primary Examiner* — Abe Massad
(74) *Attorney, Agent, or Firm* — Ice Miller LLP

(57) ABSTRACT

A slat for a rolling shutter comprises a body having a longitudinal channel and a side opening to the channel. A stop bar is slidably received in the body channel and is moveable between an extended position projecting from the body and a withdrawn position retracted toward the body. The stop bar comprises a rack that is actuatable through the side opening to move the stop bar between the extended and withdrawn positions. A pinion is positioned in the body channel in engagement with the rack, the rotation of the pinion actuating the rack to move the stop bar. The pinion is accessible for rotation through the side opening.

10 Claims, 9 Drawing Sheets

ROLLING SHUTTER RETRACTABLE STOP BAR

BACKGROUND OF THE INVENTION

The present invention relates to rolling shutter systems and, in particular, to a retractable stop bar for a rolling shutter.

Rolling shutter systems comprise a series of slats that are linked together to form an articulated curtain that covers an opening of a structure, such as a doorway or window. The slats typically span the width of the opening, and have an upper edge with a hook-shaped engaging track, and a lower edge with a receiving track that forms a pocket for receiving the engaging track of another slat. The slats are linked by the slidable engagement of the engaging track of a first slat in the receiving track of a second slat, to form a loosely articulated hinge between the slats. In an open position, the rolling shutter curtain is retracted or raised away from the opening by coiling or winding the slats about a spindle positioned at the top of the opening. In the closed position, the slats are unwound from the spindle and extended or lowered toward the bottom of the opening. An example of a shutter slat is described in U.S. Pat. No. 9,074,411 to Miller et al., which is incorporated herein by reference.

The rolling shutter may include a base slat located at the end of the series of slats, to be positioned at the bottom of the opening in the closed position. The base slat may have a seal and/or may be shaped to conform to the bottom of the opening to prevent gaps that would allow infiltration or the insertion of a pry tool. The base slat may also include a locking device for securing the rolling shutter in the closed position and prevent it from being raised from the bottom of the opening.

The rolling shutter system commonly comprises a retaining rail or guide track positioned at the sides of the opening in the host structure. The guide track typically comprises a channel that is configured to receive the ends of the slats and secure the slats in position to cover the opening of the structure. The ends of the slats include an end retention device that is received in the guide track to align and prevent disengagement of the slat ends from the guide track. Examples of end retention systems are described in U.S. Pat. Nos. 8,616,261 and 8,925,617 to Miller, which are incorporated herein by reference.

As the rolling shutter is raised to an open position, there is a risk that the slats may be inadvertently lifted out of and disengaged from the guide tracks. To ensure that the rolling shutter is retained in the guide tracks, it is desirable that the rolling shutter system include a stop mechanism that restricts the movement and prevents the withdrawal of the rolling shutter from the guide track. The stop mechanism is preferably adjustable, to accommodate situations that may require the rolling shutter to be removed from the guide tracks—e.g., during installation, replacement, or repair of the rolling shutter.

SUMMARY OF THE INVENTION

In one embodiment, a slat for a rolling shutter comprises a body having opposite first and second body ends, opposite first and second body sides, a longitudinal body channel having a channel opening at the first body end, and a side opening to the channel in the first body side. A stop bar comprises a rack, the stop bar slidably received in the body channel and moveable between an extended position projecting from the channel opening and a withdrawn position retracted toward the body. The rack is actuatable through the side opening to move the stop bar between the extended and withdrawn positions. In a further embodiment, a pinion is positioned in the body channel in engagement with the rack. The rotation of the pinion actuates the rack to move the stop bar. In a further embodiment, the pinion is accessible for rotation through the side opening.

In another embodiment, a slat for a rolling shutter comprises a body having opposite first and second body ends, opposite first and second body sides, a longitudinal body channel having a channel opening at the first body end, and a side opening to the channel in the first body side. A stop bar comprises a rack, the stop bar slidably received in the body channel and moveable between an extended position projecting from the channel opening and a withdrawn position retracted toward the body. The rack is actuatable through the side opening to move the stop bar between the extended and withdrawn positions. The rack comprises a plurality of detents formed in the stop bar, the detents alternately engageable through the side opening to move the stop bar between the extended and withdrawn positions. In a further embodiment, the stop bar further comprises a longitudinal slot, and a pin positioned in the slot. The pin travels in the slot as the stop bar moves between the extended and withdrawn positions. In a further embodiment, the pin is a removable fastener accessible through the side opening to releasably secure the position of the stop bar in the body channel.

In another embodiment, a rolling shutter system comprises a slat and a guide track. The slat comprises a body having opposite first and second ends, opposite first and second sides, a longitudinal body channel having a channel opening at the first end, and a side opening to the channel in the first side. A stop bar comprises a rack, the stop bar slidably received in the body channel and moveable between an extended position projecting from the channel opening and a withdrawn position retracted toward the body. The guide track has a longitudinal guide channel, and a stop positioned in the guide channel. The rack is actuatable through the side opening to move the stop bar between the extended and withdrawn positions. The stop bar projects transversely into the guide channel, and is slidable longitudinally in the guide channel. The stop bar in the extended position is positioned to engage the stop.

DETAILED DESCRIPTION OF THE INVENTION

Figure 1:
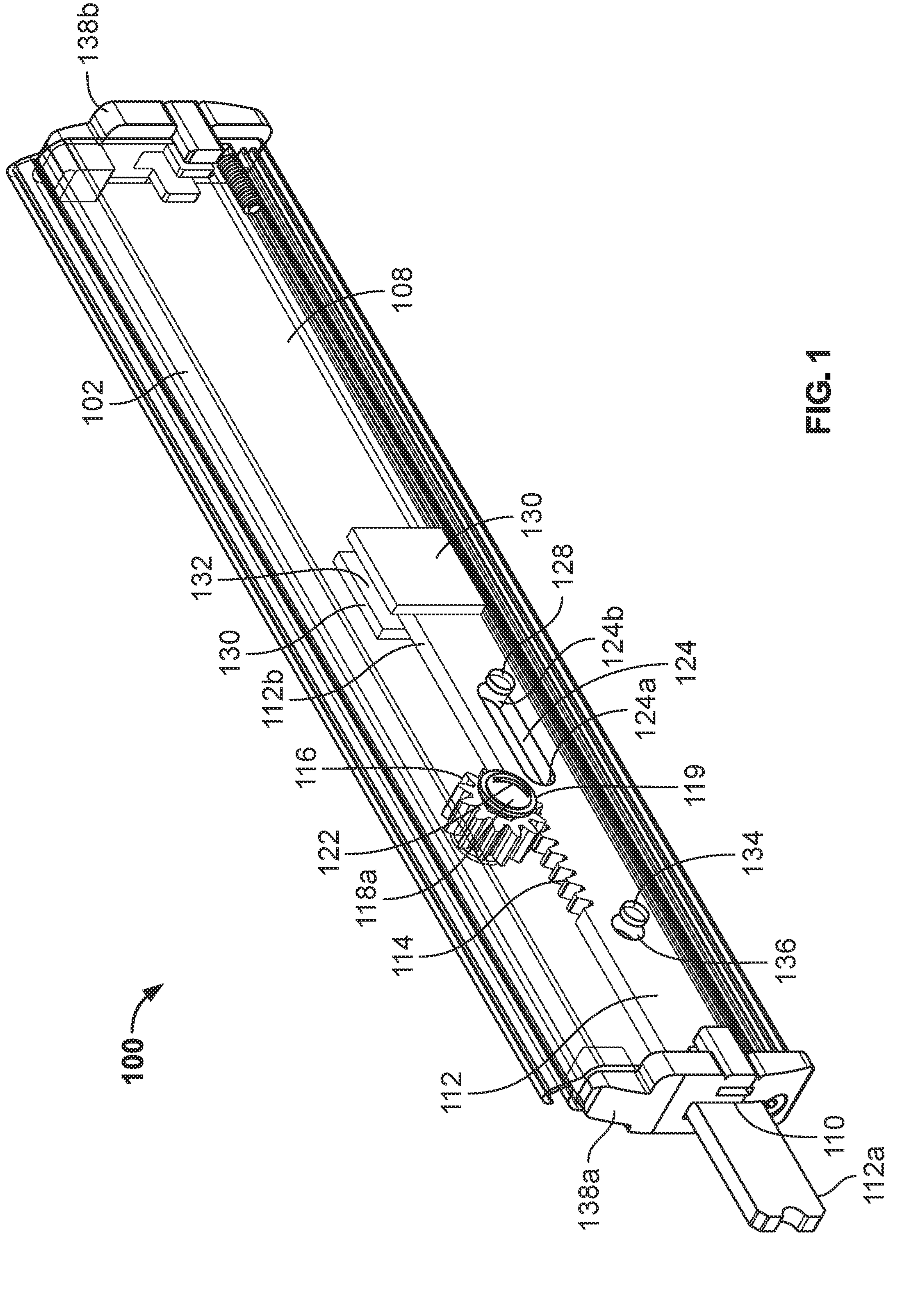
FIG. 1 is an isometric view of an embodiment of a rolling shutter slat including a stop bar, showing hidden lines.
Figure 3:
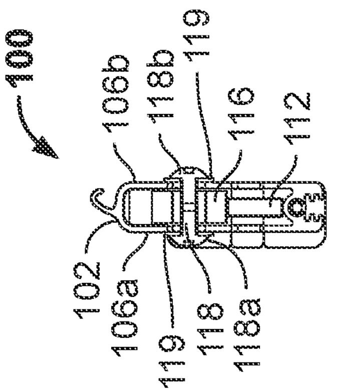
FIG. 3 is an end section view of the rolling shutter slat of FIG. 1.
Figure 5:
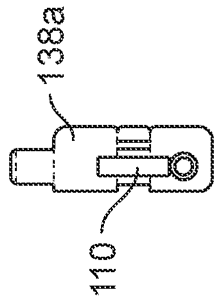
FIG. 5, is a front view of the end cap of the rolling shutter of FIG. 1.
Figure 2:
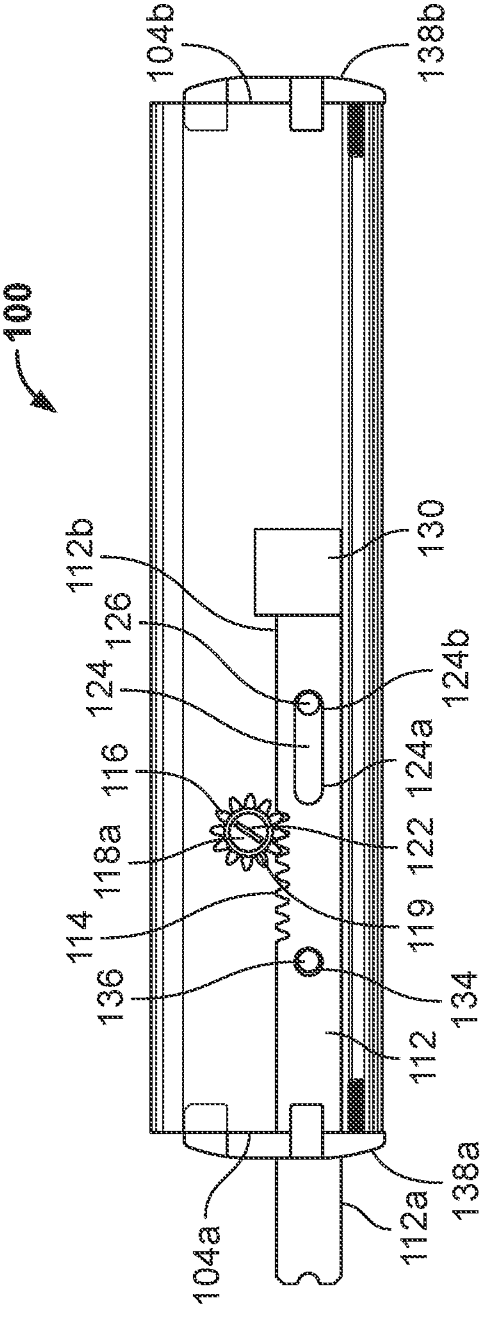
FIG. 2 is a side section view of the rolling shutter slat of FIG. 1
Figure 4:
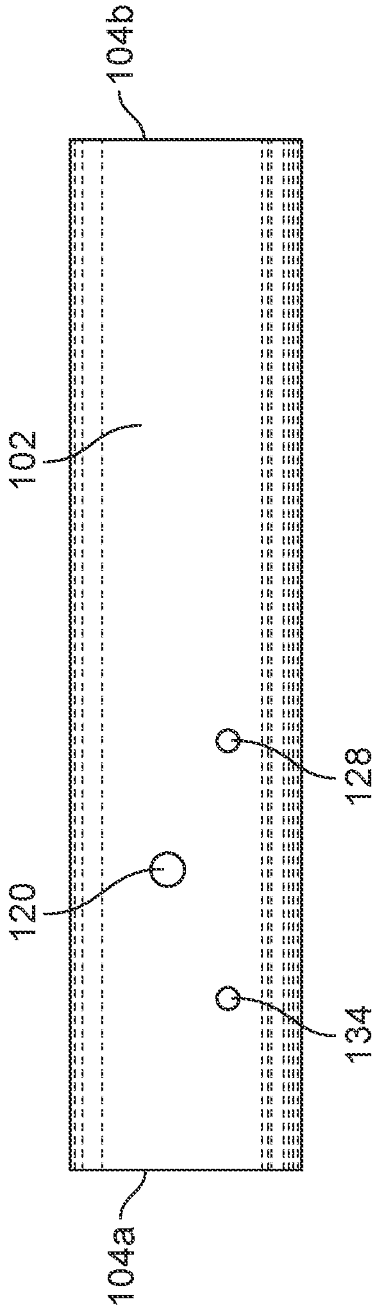
FIG. 4 is a side view of the body of the rolling shutter slat of FIG. 1.

Referring to FIGS. 1-5, an embodiment of a slat 100 for a rolling shutter is shown, that comprises a stop bar for preventing the inadvertent removal of the rolling shutter from a guide track—e.g., during retraction of the rolling shutter. Slat 100 may be positioned at any location in the series of rolling shutter slats, but is preferably positioned as the base slat or proximal to the base slat. Slat 100 has a body 102 with opposite ends 104*a* and 104*b*, opposite sides 106*a* and 106*b*, and a longitudinal channel 108 with an opening 110 at end 104*a*. In one embodiment, body 102 is a generally rectangular hollow tube, with an interior channel 108 that extends the length of the body.

A stop bar 112 is slidably received in channel 108 and opening 110, and has opposite ends 112*a* and 112*b*. Stop bar 112 is movable longitudinally within channel 108 and body 102, between an extended position with end 112*a* projecting from channel opening 110 and end 112*b* positioned in channel 108, and a withdrawn position with end 112*a* retracted toward the slat body.

Stop bar 112 comprises a linear actuator for moving stop bar 112 between the extended and withdrawn positions. In one embodiment, the linear actuator is a rack 114, that comprises a series of regularly spaced teeth. Rack 114 may be formed integrally in stop bar 112, or may be formed separately and coupled to the stop bar. Slat 100 includes a pinion 116 that is positioned in channel 108 and comprises complementary radial teeth that are meshed or engaged with the teeth of rack 114. The rotation of pinion 116 actuates rack 114 to move stop bar 112 between the extended and withdrawn positions.

In one embodiment, pinion 116 is coupled to an axial pin 118 that extends transverse to channel 108 and body 102. Rotation of pin 118 rotates pinion 116 to actuate rack 114 and drive the movement of stop bar 112. Openings 120 may be formed in slat body sides 106*a* and/or 106*b*, that are sized and shaped to receive and secure pin 118 in position relative to slat body 102. Pin 118 is preferably accessible from side 106*a* of body 102, to facilitate rotation of the pin. In one embodiment, pin 118 has an end or head 118*a* that projects from opening 120 and side 106*a*, and is accessible outside body 102. Head 118*a* may be formed for engagement of a tool for manual rotation of pin 118, to rotate pinion 116 through openings 120 and actuate rack 114. For example, head 118*a* may be formed with a drive slot 122 for engaging a screwdriver to rotate pin 118. In an alternative embodiment, pin 118 may have heads 118*a* and 118*b* that respectively project from openings 120 at either side 106*a* and 106*b* of body 102, and one or both heads 118*a* and 118*b* may be formed to engage a tool for rotation of pin 118.

In one embodiment, stop bar 112 includes a longitudinal slot 124 with a first end 124*a* proximal to stop bar end 112*a*, and a second end 124*b* proximal to stop bar end 112*b*. A pin 126 projects transversely in channel 108, and is positioned in stop bar slot 124. The travel of pin 126 in stop bar slot 124 guides the movement of stop bar 112 longitudinally in channel 108 between the extended and withdrawn positions. Openings 128 may be formed in slat body sides 106*a* and/or 106*b*, that are sized and shaped to receive and secure pin 126 in position relative to slat body 102. In a preferred embodiment, pin 126 is positioned in body 102, and stop bar slot 124 is configured such that pin 126 is positioned at slot end 124*b* when stop bar 112 is in the extended position, and pin 126 is positioned at slot end 124*a* when stop bar 112 is in the withdrawn position. In one embodiment, pin 126 is a fastener that is removably secured to body 102, such as a bolt or screw.

Body 102 may include one or more flanges 130 within channel 108, to further guide the movement of stop bar 112 longitudinally in the channel, and to resist lateral or torsional forces on the stop bar. In one embodiment, two spaced apart flanges 130 project into channel 108. A slot 132 is defined between flanges 130, that is sized and shaped to slidingly receive stop bar 112. The travel of stop bar 112 in slot 132 directs the movement of the stop bar longitudinally in the channel, and restricts the transverse movement or twisting of the stop bar.

Slat 100 preferably includes a mechanism for reversibly locking stop bar 112 in the extended position. In one embodiment, body 102 includes a lock opening 134 and stop bar 112 includes a lock opening 136. Lock openings 134 and 136 are positioned to be aligned when the stop bar is in the extended position and pin 126 is positioned at slot end 124*b*. Aligned openings 134 and 136 are sized and shaped to receive a lock pin (not shown) that projects transversely in channel 108 through stop bar 112 to secure the stop bar in the extended position relative to body 102. The lock pin is preferably a removeable fastener, such as a bolt or screw fastened to body 102. Openings 134 and/or 136 may be threaded to receive the fastener.

In one embodiment, body 102 comprises an end cap 138*a* positioned at body end 104*a*. Channel opening 110 may be formed in end cap 138*a*, and is sized and shaped to receive stop bar 112. In a preferred embodiment, slat 100 has body ends 104*a* and 104*b* that respectively have end caps 138*a* and 138*b* with mirror image configurations. Stop bars 112 are positioned at each body end 104*a* and 104*b*, and also have mirror image configurations as described above, with extended positions that project in opposite directions from openings 110 in end caps 138*a* and 138*b*.

The stop bar assembly, including stop bar 112 and pinion 116, is advantageously enclosed within the hollow tube of body 102 to prevent or reduce the introduction of debris that may accumulate and interfere with the operation of the stop bar. Enclosure of the stop bar assembly also provides protection from the environment, such as seacoast installations where humid or salt air conditions may promote corrosion. In one embodiment, pin 118 is mounted in body openings 120 with a washer 119 positioned between pin head 118*a* and/or 118*b*, and body 102. Washer 119 provides an additional seal against the environment and the introduction of debris into body 102 and channel 108 that may interfere with the operation of stop bar 112.

Figure 6:
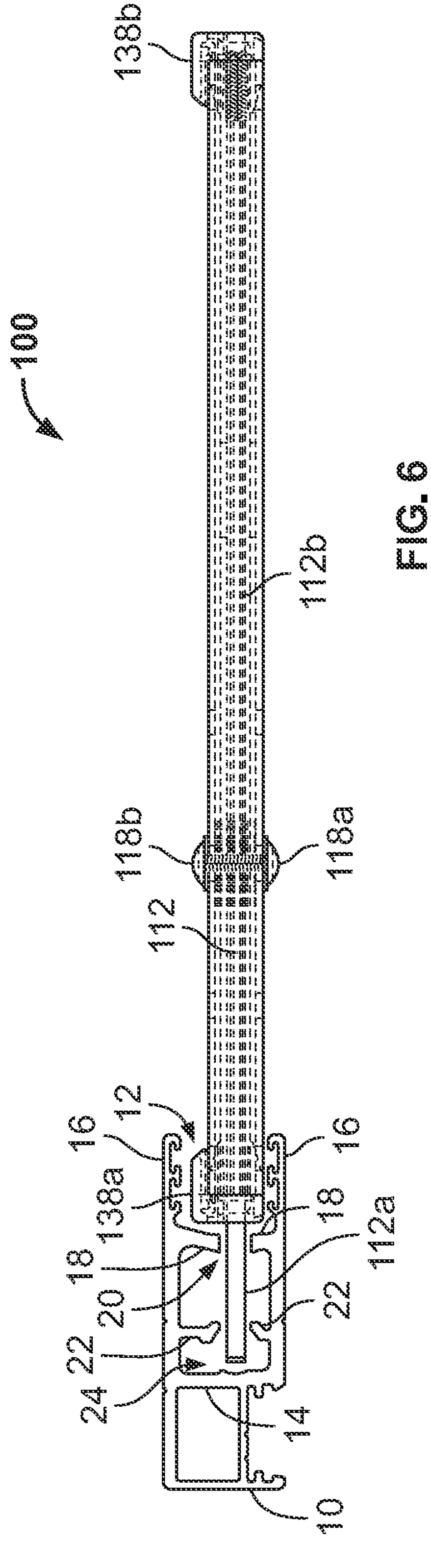
FIG. 6 is a top section view of the rolling shutter of FIG. 1, installed in a guide track.
Figure 7:
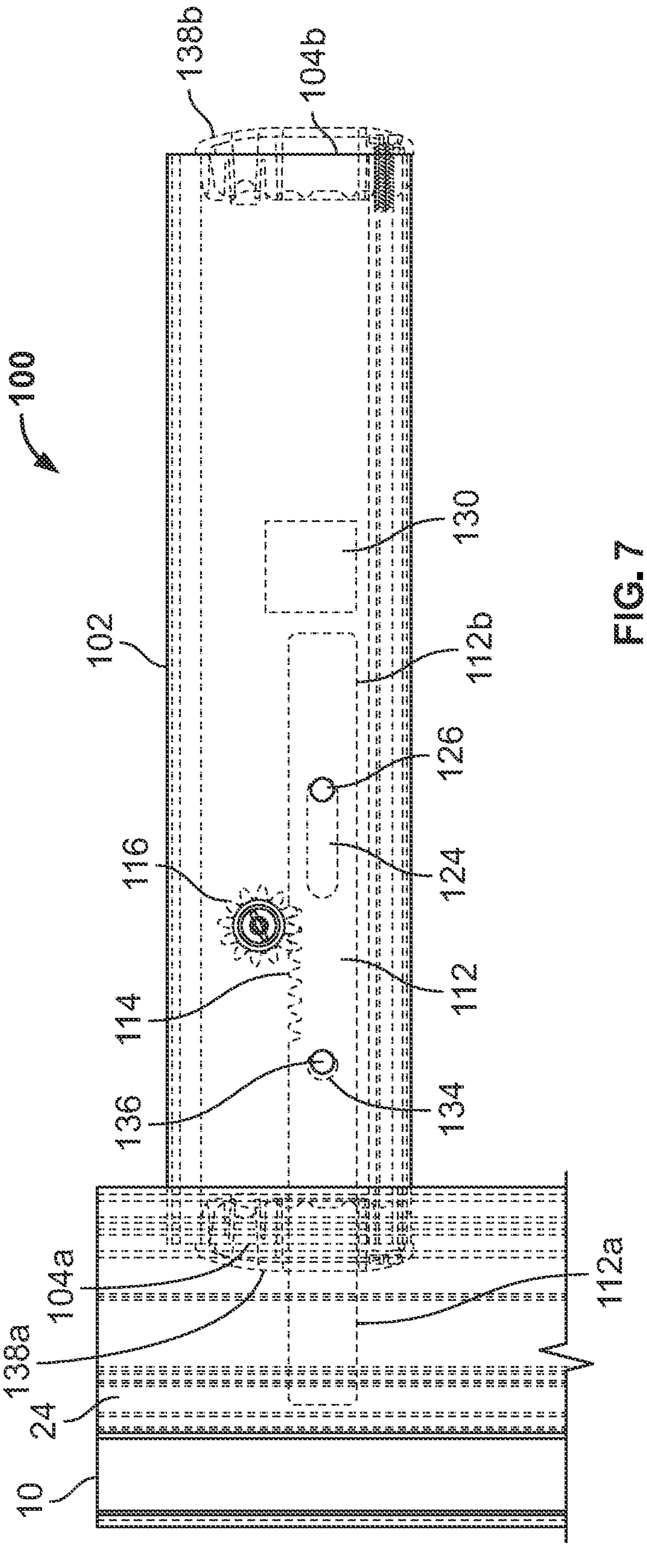
FIG. 7, is a side view of the rolling shutter of FIG. 6, showing hidden lines.
Figure 8:
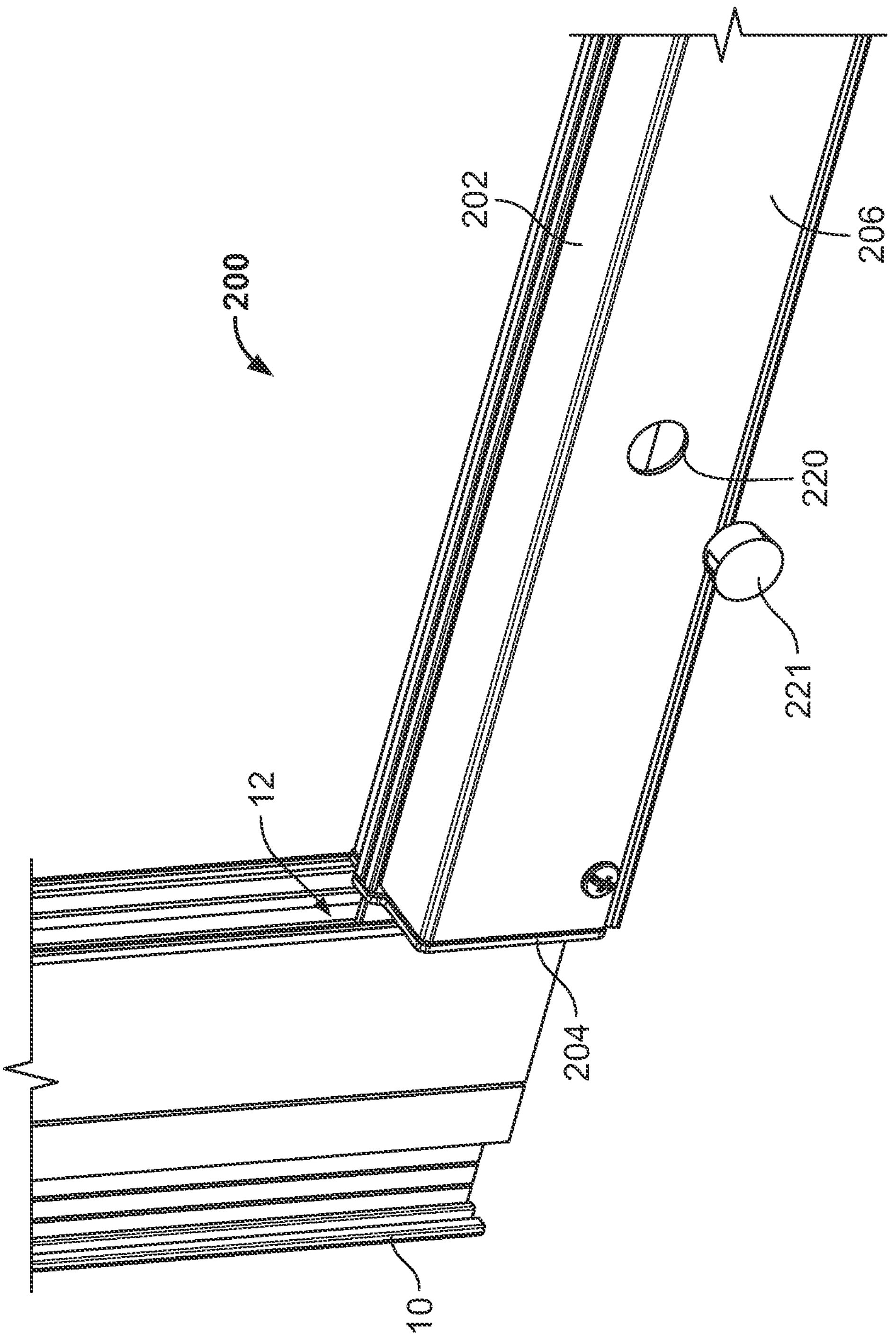
FIG. 8 is an isometric view of an alternative embodiment of a rolling shutter slat including a stop bar, installed in a guide track.

Referring to FIGS. 6 and 7, slat 100 is shown positioned at a guide track 10 that comprises a generally U-shaped, longitudinal guide channel 12 formed between a base 14 and walls 16. Channel 12 may be sized and shaped to receive end 104*a* (and end cap 138*a*) of body 102, which slides longitudinally in guide channel 12 as the rolling shutter is raised or lowered. Stop bar 112 moves transversely within guide channel 12 between the extended and withdrawn positions, and slides longitudinally in the guide channel as the rolling shutter is raised or lowered. Two opposing flanges 18 project from walls 16 into guide channel 12 and are spaced apart to form a slot 20 that is sized and shaped to receive stop bar 112, and to align and guide the longitudinal movement of the stop bar in the guide channel.

In one embodiment, one or more flanges 22 project from walls 16 and/or base 14 into channel 12 to form a receptacle 24 that is sized and shaped to receive a guide stop (not shown). In a preferred embodiment, receptacle 24 is formed between two flanges 22 and base 14. When stop bar 112 is in the extended position, stop bar end 112*a* is positioned to engage the guide stop. In the embodiment of FIGS. 6 and 7, stop bar end 112*a* is extended into receptacle 24, and is positioned to contact the guide stop (not shown) and restrict the travel of slat 100 longitudinally within guide channel 12. For example, the guide stop may be positioned at the top of guide track 10 to engage stop bar 112 as the rolling shutter is raised and prevent the inadvertent removal of slat 100 and the rolling shutter from guide track 10. When stop bar 112 is in the withdrawn position, stop bar end 112*a* is retracted from position to engage the guide stop. Slat 100 may travel freely within guide channel 12, and slat 100 may be raised out of guide track 10 to allow the rolling shutter to be removed from the guide track. In a preferred embodiment, the guide stop is a spring that is received in receptacle 24 to provide a resilient stop to the movement of slat 100 in guide track 10.

FIGS. 8-12 show an alternative embodiment of a slat 200, that has a body 202 and stop bar 212 with the same general configuration as slat 100. Body 202 has opposite ends including end 204, opposite sides including side 206, and a longitudinal channel 208 with a stop bar opening (not shown) at end 204. In one embodiment, body 202 is a generally rectangular hollow tube, with an interior channel 208 that extends the length of the body.

Stop bar 212 is slidably received in channel 208 and the stop bar opening, and has opposite ends including end 212*a*. Stop bar 212 is movable longitudinally within channel 208 and body 202, between an extended position with end 212*a* extended away from the slat body, and a withdrawn position with end 212*a* retracted toward the slat body.

Stop bar 212 includes a linear actuator comprising a rack for moving stop bar 212 between the extended and withdrawn positions. The rack comprises a series of detents 214, that may be alternately engaged to move stop bar 212. Detents 214 may be formed integrally in stop bar 212, or may be formed separately and coupled to the stop bar. In one embodiment, detents 214 are manually engaged to move stop bar 212 between the extended and withdrawn positions. An opening 220 into channel 208 is formed in side 206 to allow access to detents 214. In a preferred embodiment, opening 220 is sized and shaped to allow insertion of a tool (e.g., a screwdriver), to alternately engage detents 214 through opening 220 and manually slide stop bar 212 between the extended and withdrawn positions.

Figure 9:
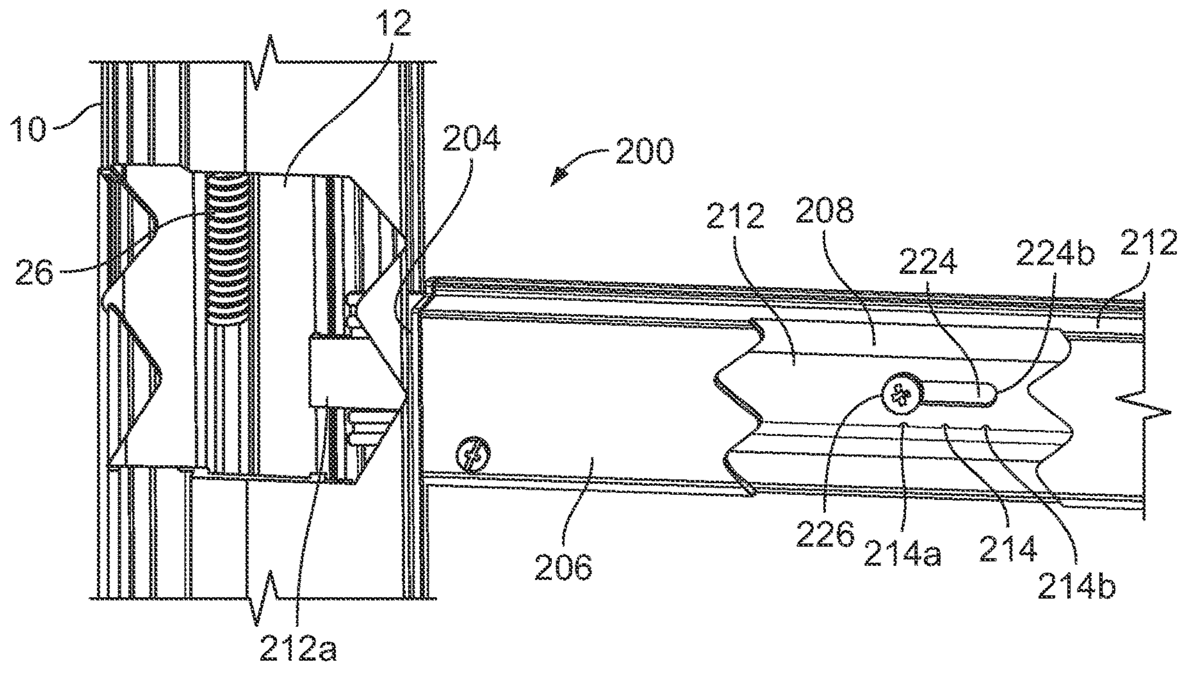
FIG. 9 is partial cutaway, side view of the rolling shutter slat of FIG. 8, showing the stop bar in the withdrawn position.

In one embodiment, stop bar 212 includes a longitudinal slot 224 with a first end 224*a* proximal to stop bar end 212*a* and a second end 224*b* proximal to stop bar end 212*b*. A pin 226 projects transversely in slat channel 208 and is positioned in stop bar slot 224. Pin 226 is secured in position relative to slat body 202. The travel of pin 226 in stop bar slot 224 guides the movement of stop bar 212 longitudinally in channel 208 between the extended and withdrawn positions. In a preferred embodiment, pin 226 is positioned in body 202 and stop bar slot 224 is configured such that pin 226 is positioned at slot end 224*b* when stop bar 212 is in the extended position (FIG. 10), and is positioned at slot end 224*a* when stop bar 212 is in the withdrawn position (FIG. 9).

Figure 10:
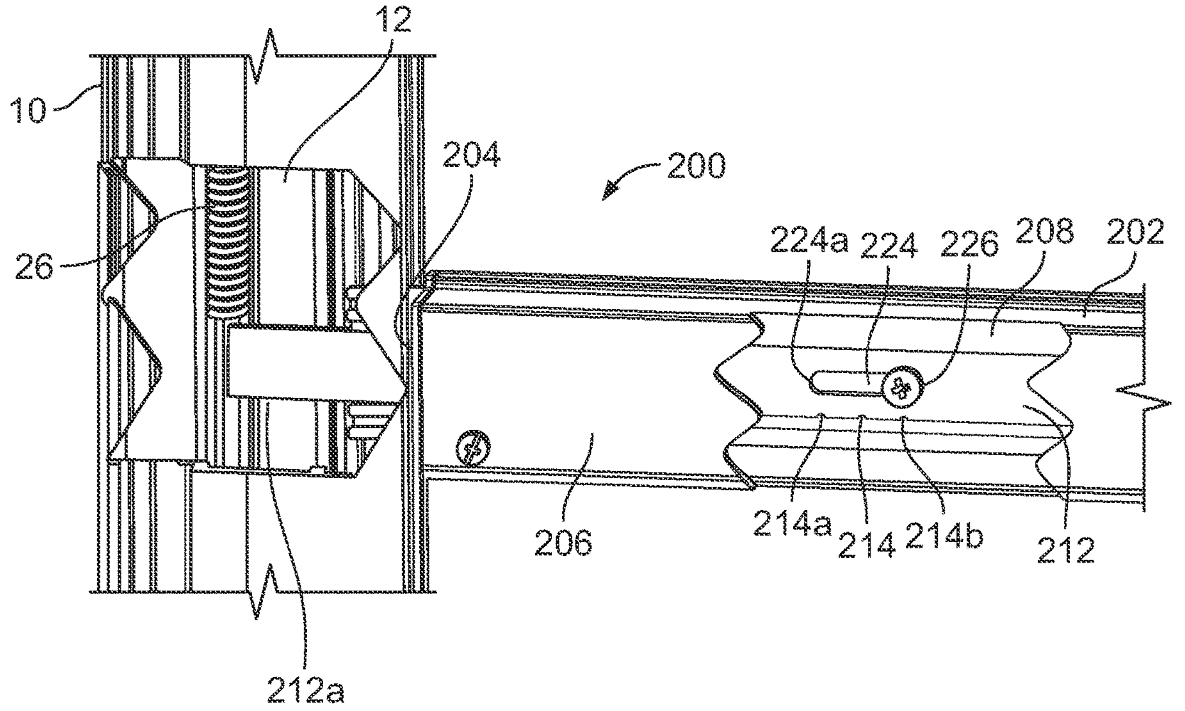
FIG. 10 is partial cutaway, side view of the rolling shutter slat of FIG. 8, showing the stop bar in the extended position.

In another embodiment, the series of detents 214 are arranged longitudinally on stop bar 212. For example, detents 214 may be a series of indents or notches formed at an edge of stop bar 212, such as bottom edge 215 (FIGS. 9 and 10). In a preferred embodiment, the series of detents 214 are approximately coextensive with the length of slot 224, and include an initial detent 214*a* positioned proximal to slot end 224*a* and a terminal detent 214*b* positioned proximal to slot end 224*b*. Pin 226 is positioned at detent 214*b* when stop bar 212 is in the extended position, and is positioned at detent 214*a* when stop bar 212 is in the withdrawn position.

Figure 11:
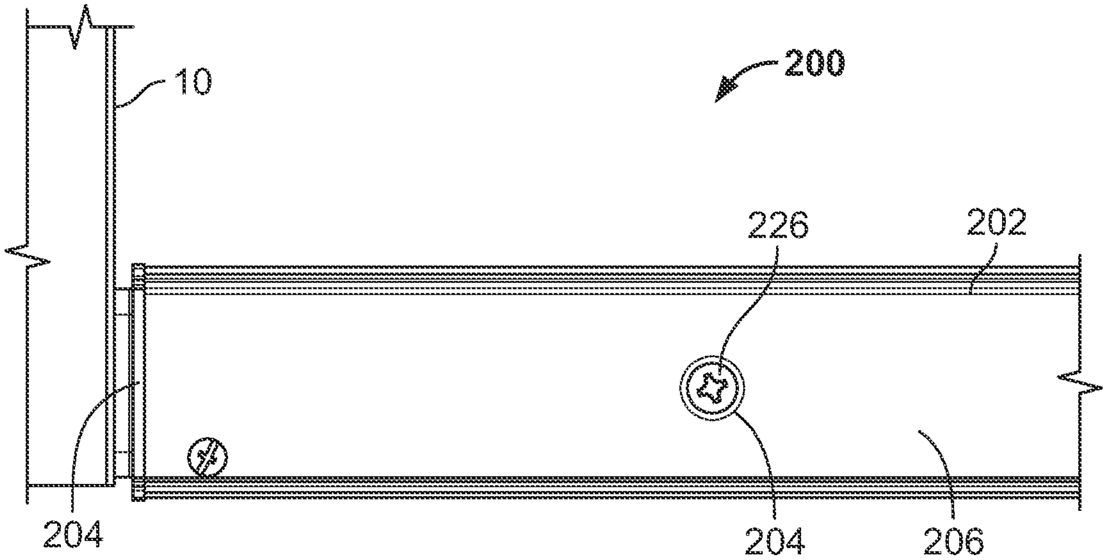
FIG. 11 is a side view of the rolling shutter slat of FIG. 8, showing the stop bar fastener accessible through the slat body side opening.
Figure 12:
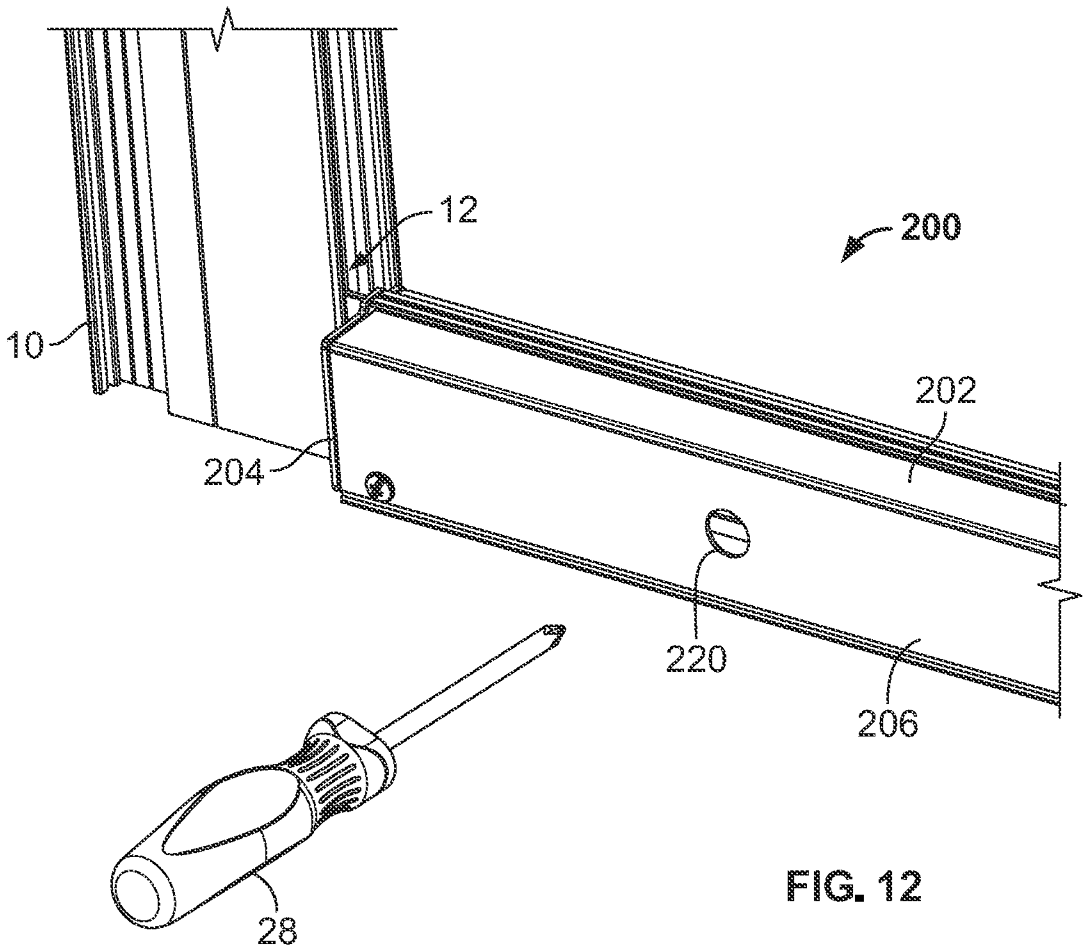
FIG. 12 is an isometric view of the rolling shutter slat of FIG. 11, showing the use of a tool to operate the stop bar fastener through the slat body side opening.
Figure 13:
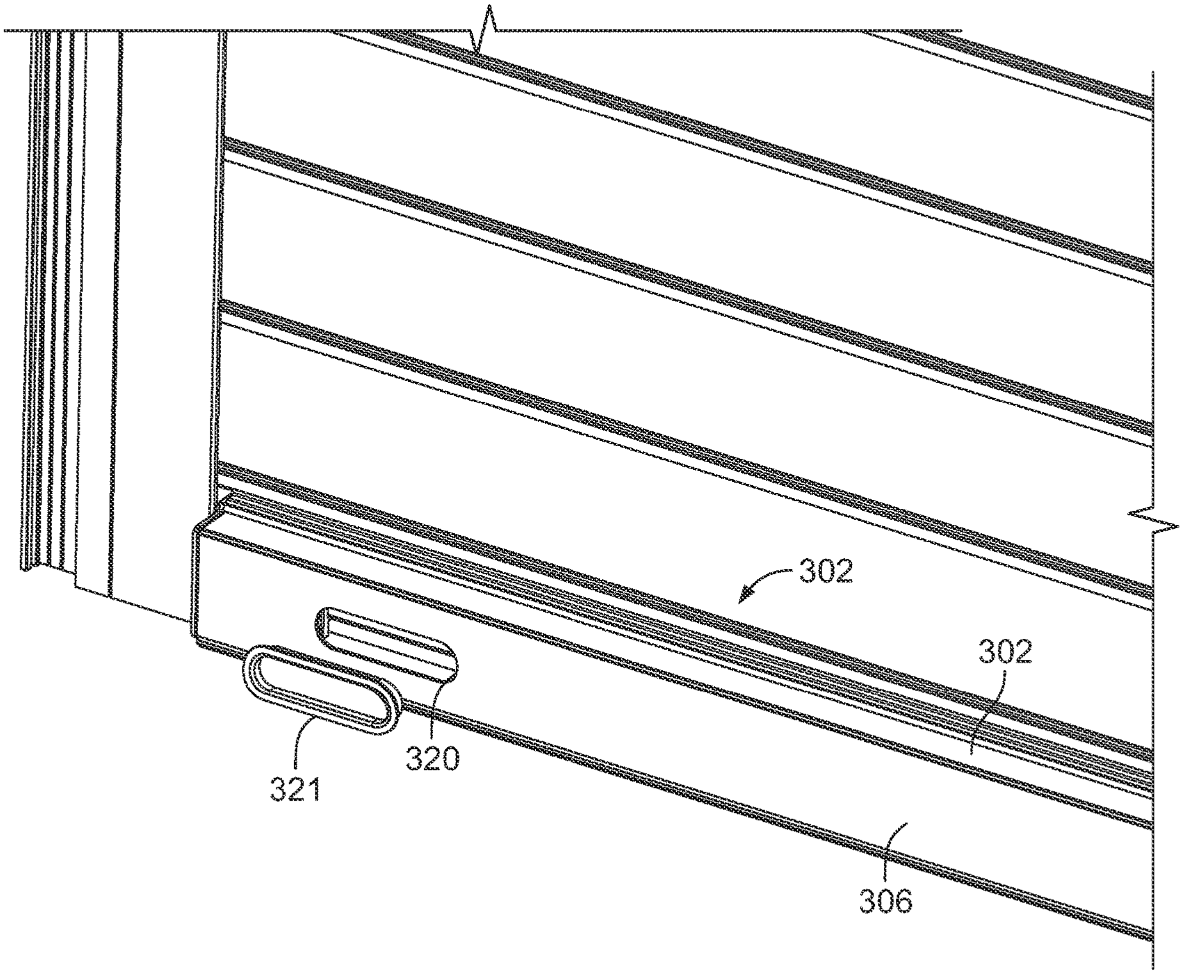
FIG. 13 is an isometric view of another alternative embodiment of a rolling shutter slat including a stop bar, installed in a guide track.

In one embodiment, pin 226 is a removable fastener that releasably secures stop bar 226 in position in channel 208 and body 202, such as a bolt or screw. Fastener 226 may include a head that is accessible through opening 220 to allow the fastener to be manually operated. In one embodiment, the head of fastener 226 may be formed to engage a tool for manually securing fastener 226. For example, the head of fastener 226 may comprise a screw drive (e.g., slot or Phillips) that is accessible to a screwdriver 28 through opening 220 (FIGS. 11 and 12). In a further embodiment, slat 200 may include a cap 221 (FIG. 8) that is sized and shaped to cover opening 220 and conceal fastener 226 and detents 214. Cap 221 also prevents the introduction of debris into channel 208, which may interfere with the actuation or movement of stop bar 212.

Slat body end 204 is positioned at guide track 10. Stop bar 212 moves transversely within guide channel 12 between the extended and withdrawn positions, in a similar manner as described for stop bar 112. FIG. 10 shows stop bar 212 in the extended position with stop bar end 212*a* positioned to engage a (spring) guide stop 26, to restrict the movement of slat 200 longitudinally within guide channel 12. FIG. 9 shows stop bar 212 in the withdrawn position with stop bar end 212*a* retracted from position to engage guide stop 26, to allow slat 200 to move freely longitudinally within guide channel 12.

Figure 14:
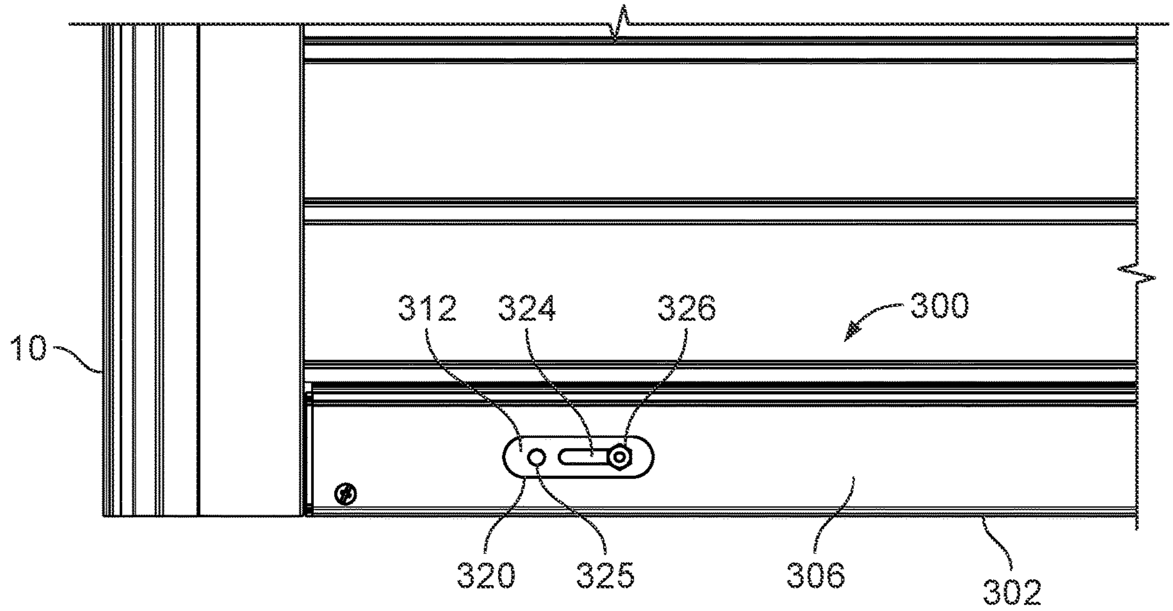
FIG. 14 is a side view of the rolling shutter slat of FIG. 13, showing the stop bar fastener accessible through the slat body side opening.
Figure 15:
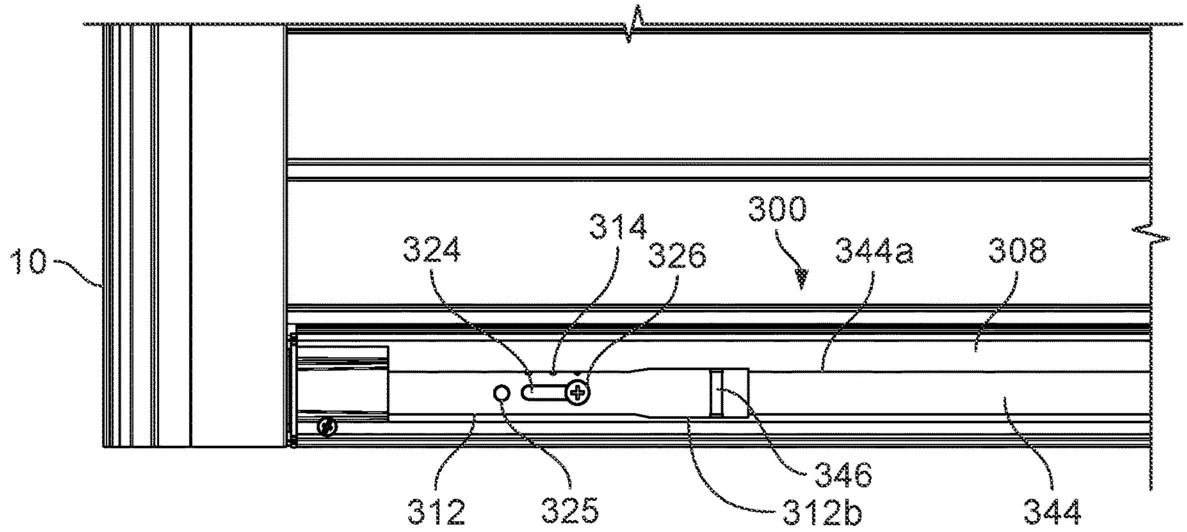
FIG. 15 is partial cutaway, side view of the rolling shutter slat of FIG. 13, showing the stop bar in the extended position.

FIGS. 13-16 show an alternative embodiment of a slat 300 that has the same general configuration as slat 200. Slat 300 has a body 302 with a side 306 and a channel 308. An opening 320 into channel 308 is formed in side 206. A stop bar 312 is positioned in channel 308, and includes a series of detents 314 and a longitudinal slot 324. Detents 314 may be alternately engaged to move stop bar 312 longitudinally within channel 308 between the extended and withdrawn positions. A pin 326 projects transversely in slat channel 308, and is positioned in stop bar slot 324 to guide the movement of stop bar 312 longitudinally in channel 308. In one embodiment, pin 326 is a removable fastener that releasably secures the position of stop bar 312 in channel 308 and body 302. In the embodiment of FIG. 14, fastener 326 is a nut and bolt.

Detents 314 and pin 326 are accessible to a tool through opening 320—e.g., to engage the detents to move stop bar 312 and/or to secure fastener 326, as previously described. In one embodiment, opening 320 is sized and shaped to be at least the size and shape of slat 324. In a preferred embodiment, opening 320 is positioned in side 206 and is sized and shaped to allow simultaneous access to all of detents 314 and fastener 326, when stop bar 312 is in the extended position (FIG. 14). Slat 300 may include a cap 321 that is sized and shaped to cover opening 320, to conceal fastener 326 and detents 314, and to prevents the introduction of debris into channel 308.

Figure 16:
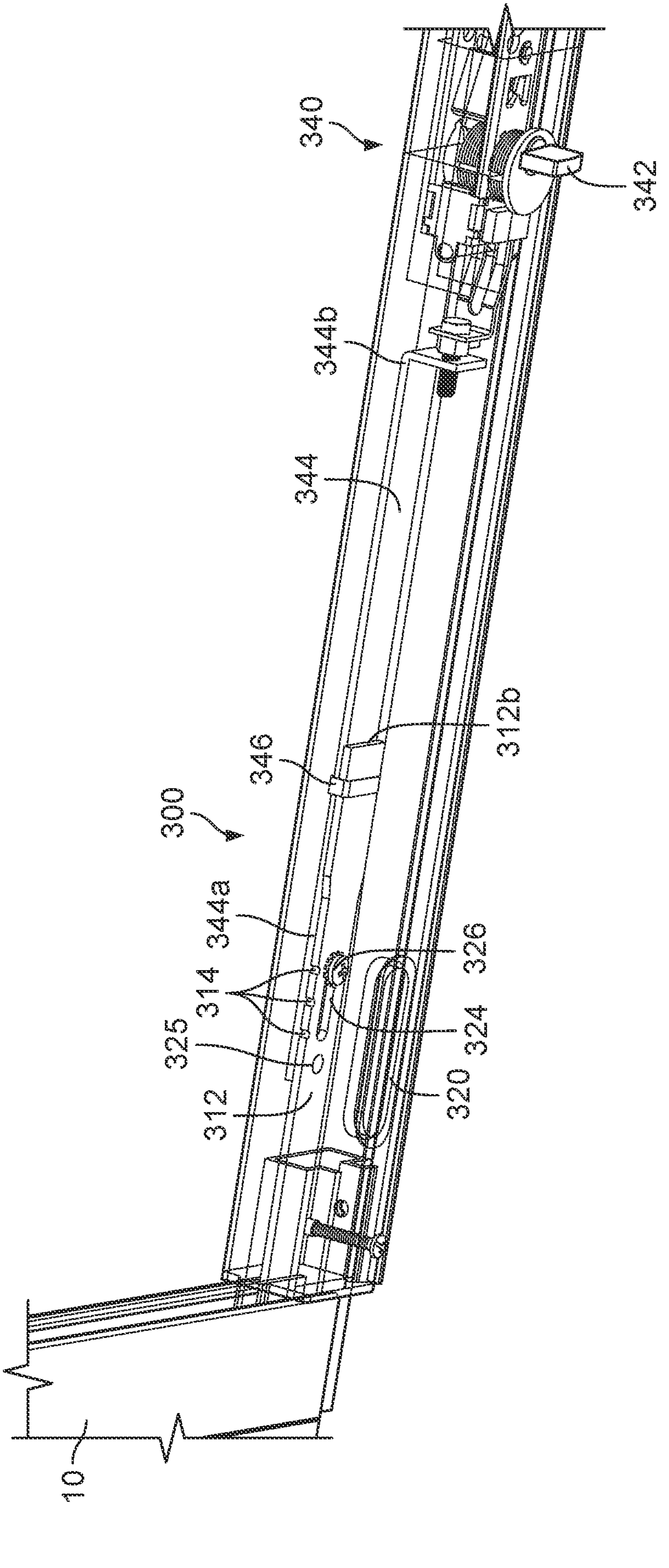
FIG. 16 is cutaway, isometric view of the rolling shutter slat of FIG. 13, showing the locking device and lock arm.

Slat 300 may also be configured to function as a lock slat for securing the rolling shutter in position—e.g., to secure the rolling shutter in the closed position and prevent it from being raised from the opening. In the embodiment of FIG. 16, stop bar 312 is a combination stop bar and lock bar. Slat 300 includes a locking device 340, such as a conventional thumb turn device 342. Stop bar 312 is coupled to locking device 340 by a lock arm 344 that has opposite ends 344*a* and 344*b*. Lock arm end 344*a* is coupled to stop bar 312, and lock arm end 344*b* is coupled to locking device 340. In a preferred embodiment, lock arm end 344*a* is releasably secured to stop bar 312 by pin 326.

During operation of fastener 326 to release or secure stop bar 312 to lock arm 344, the fastener may inadvertently be removed from stop bar slot 324 and can fall into body 302 (channel 308) where it is inaccessible to the operator. Pin 326 may be modified to prevent it from being completely removed from stop bar 312 to lock arm 344, and secure the pin from inadvertent loss. In one embodiment, pin 326 may extend through both stop bar 312 and lock arm 344, and have an end opposite the stop bar that projects beyond the lock arm (not shown). This opposite end may be modified to prevent removal of pin 326 from lock arm 344, such as by swedging or staking the end of the pin, as is known in the art.

Slat 300 may include a clip 346 that slidingly couples stop bar 312 and lock arm 344. In one embodiment, clip 346 is sized and shaped to receive and align stop bar 312 and lock arm 344 with their longitudinal axes in parallel. Clip 346 allows stop bar 312 and lock arm 344 to slide longitudinally relative to each other, but restricts the lateral movement or rotation of the stop bar and lock arm relative to each other. Clip 346 is preferably spaced apart from pin 326 (e.g., positioned at stop bar end 312*b*), such that stop bar 312 and lock arm 344 are aligned parallel to each other by the clip and pin. In one embodiment, slat 300 has two or more clips 346 that are spaced apart to resist the relative rotation and facilitate the parallel alignment of stop bar 312 and lock arm 344.

The actuation of locking device 340 (e.g., rotation of thumb turn 342) moves lock arm 344 (and coupled stop bar 312) longitudinally in channel 308 between locked and unlocked positions. The actuation of locking device 340 to the unlocked position, retracts lock arm 344 away from guide track 10. The retraction of lock arm 344 positions the coupled stop bar 312 such that the stop bar may be moved (e.g., by actuation of rack 114 or detents 214/314) between a withdrawn position, and an extended position where the end of the stop bar is positioned to engage guide stop 26, as described above. The actuation of locking device 340 to the locked position, extends lock arm 344 toward guide track 10. The extension of lock arm 344 positions the coupled stop bar 312 such that the end of the extended stop bar is moved beyond guide stop 26 to engage a lock stop positioned in guide track 10 (not shown). In one embodiment, the lock stop may be a flange positioned in guide track 10 to engage the end of stop bar 312 in the locked position. In a preferred embodiment, stop bar 312 in the locked position extends beyond base 14 of guide track 10, and the lock stop is an opening formed in the base of the guide track 10 that is sized and shaped to receive the end of the stop bar.

Fastener (pin) 326 may inadvertently loosen over time or may be improperly secured by the operator. Slat 300 preferably includes a mechanism in addition to pin 326 for reversibly securing stop bar 312 in the extended position relative to lock arm 344. In one embodiment, stop bar 312 includes a lock opening 325 (FIGS. 14-16) that is sized and shaped to receive a lock pin (not shown). When stop bar 312 is in the extended position relative to lock arm 344, lock opening 325 is aligned with a similar lock opening in the lock arm (not shown). The lock pin may be inserted through the lock openings of stop bar 312 and lock arm 344, to assist in securing the stop bar in the extended position. The lock pin is preferably a releasable fastener, such as a screw or bolt, and lock opening 325 is preferably positioned to allow access through opening 320 (FIG. 16).

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. A slat for a rolling shutter, comprising:

a tubular body having opposite first and second body ends, opposite first and second body sides, and a longitudinal interior body channel having a channel opening at the first body end, the first body side having a first lock opening into the interior body channel and a side opening into the interior body channel;

a stop bar comprising a longitudinal slot, a second lock opening and a rack, the stop bar slidably received in the interior body channel and moveable longitudinally between an extended position projecting from the channel opening and a withdrawn position retracted toward the body;

an end cap positioned at the body first end, the channel opening formed in the end cap;

a stop bar pin positioned in the longitudinal slot, wherein the stop bar pin travels in the longitudinal slot and guides the longitudinal movement of the stop bar between the extended and withdrawn positions; and first and second flanges positioned in the interior body channel and spaced apart to form a guide slot that is sized and shaped to receive the stop bar, wherein the guide slot guides the longitudinal movement and restricts the transverse movement of the stop bar in the interior body channel;

wherein the rack is actuatable through the side opening to move the stop bar between the extended and withdrawn positions, and the first and second lock openings are aligned transversely though the body channel when the stop bar is in the extended position.

2. The slat of claim 1, further comprising a lock pin, wherein the aligned first and second lock openings are sized and shaped to receive the lock pin projecting transversely through the body channel to secure the stop bar in the extended position.

3. The slat of claim 1, wherein the longitudinal slot has first and second slot ends, and wherein the pin is positioned at the first slot end when the stop bar is in the extended position, and the pin is positioned at the second slot end when the stop bar is in the withdrawn position.

4. The slat of claim 1, wherein the stop bar pin is a removable fastener accessible through the side opening to releasably secure the position of the stop bar in the body channel.

5. The slat of claim 4, wherein the fastener is a screw.

6. A rolling shutter system, comprising the slat according to claim 1; and a guide track with a longitudinal guide channel, and a stop positioned in the guide channel;

wherein the rack is actuatable through the side opening to move the stop bar between the extended and withdrawn positions;

wherein the stop bar in the extended position projects transversely into the guide channel, and is slidable longitudinally in the guide channel; and wherein the stop bar in the extended position is positioned to engage the stop.

7. The slat of claim 1, further comprising a pinion positioned in the body channel in engagement with the rack, wherein the rotation of the pinion actuates the rack to move the stop bar.

8. The slat of claim 7, wherein the pinion is accessible for rotation through the side opening.

9. The slat of claim 2, wherein the lock pin is a removable fastener.

10. The rolling shutter system of claim 6, wherein the stop is a spring.

* * * * *